US012669779B2

(12) United States Patent
Nakajima et al.

(10) Patent No.: US 12,669,779 B2
(45) Date of Patent: Jun. 30, 2026

(54) REGULATOR, MOVEMENT, AND TIMEPIECE

(71) Applicant: SEIKO WATCH KABUSHIKI KAISHA, Tokyo (JP)

(72) Inventors: Masahiro Nakajima, Tokyo (JP); Reiji Kimura, Tokyo (JP)

(73) Assignee: SEIKO HOLDINGS KABUSHIKI KAISHA, Tokyo (JP)

( * ) Notice: Subject to any disclaimer, the term of this patent is extended or adjusted under 35 U.S.C. 154(b) by 466 days.

(21) Appl. No.: 18/175,831

(22) Filed: Feb. 28, 2023

(65) Prior Publication Data

US 2023/0288873 A1 Sep. 14, 2023

(30) Foreign Application Priority Data

Mar. 11, 2022 (JP) ................................ 2022-037876

(51) Int. Cl.
*G04B 18/02* (2006.01)

(52) U.S. Cl.
CPC .................................. *G04B 18/02* (2013.01)

(58) Field of Classification Search
CPC .................................................... G04B 18/02
See application file for complete search history.

(56) References Cited

U.S. PATENT DOCUMENTS

2017/0357213 A1* 12/2017 Linck .................... G04B 31/06
2018/0120769 A1* 5/2018 Helfer .................... G04B 17/26

FOREIGN PATENT DOCUMENTS

EP 3309624 A1 * 4/2018 ............ G04B 15/14
JP S47-030232 B 8/1972

OTHER PUBLICATIONS

Translation of EP3309624, Espacenet (Year: 2018).*

* cited by examiner

*Primary Examiner* — Renee S Luebke
*Assistant Examiner* — Matthew Daniel Hwang
(74) *Attorney, Agent, or Firm* — Crowell & Moring LLP

(57) ABSTRACT

Provided are a regulator capable of further improving time measurement accuracy as compared with the related art, and a movement and timepiece including the regulator. A regulator includes a regulator pin. The regulator pin includes a pair of regulator pin main bodies and a regulator pin base portion. The regulator pin base portion is formed integrally with the pair of regulator pin main bodies and is held by a regulator body. The regulator pin main bodies are disposed so as to sandwich an outer end portion of a hairspring and contain zirconia. In the regulator pin, by extrusion molding, an outer peripheral surface and an inner peripheral surface of the regulator pin are formed, and the regulator pin main body and the regulator pin base portion are integrally formed.

5 Claims, 9 Drawing Sheets

REGULATOR, MOVEMENT, AND TIMEPIECE

RELATED APPLICATIONS

This application claims priority to Japanese Patent Application No. 2022-037876 filed on Mar. 11, 2022, the entire content of which is incorporated herein by reference.

BACKGROUND OF THE INVENTION

1. Field of the Invention

The present invention relates to a regulator, a movement, and a timepiece.

2. Description of the Related Art

In the related art, there is known a configuration of a mechanical timepiece using a hairspring fixed to a center of a balance with hairspring. Regarding the mechanical timepiece, various techniques have been proposed in which a rate is adjusted by adjusting an effective length of the hairspring by using, for example, a regulator, and isochronism of the rate is adjusted (tilt-adjusted) by adjusting an interval between the hairspring and a regulator pin.

For example, JPS47-030232B discloses a configuration of a regulator including a pair of regulator pins that sandwich an outer end portion of a hairspring, and a regulator seat capable of adjusting an interval between the regulator pins by rotating the regulator pins. The regulator pin is formed of an abrasion-resistant material having a low friction coefficient, such as ruby or spinel. According to the technique described in JPS47-030232B, abrasion of the regulator pin can be prevented by forming the regulator pin with an abrasion-resistant material. Accordingly, a change in isochronism due to a change in interval between the hairspring and the regulator pins, a change in rate due to generation of abrasion powder, and the like can be prevented, and time measurement accuracy can be improved.

However, in the technique described in PTL 1, abrasion of the hairspring that is to come into contact with the regulator pins may not be sufficiently prevented. That is, depending on a material for the regulator pin, the hairspring may be abraded. When the hairspring is abraded, the interval between the hairspring and the regulator pins changes. Abrasion powder may be generated between the hairspring and the regulator pins, and the abrasion powder may adhere to the regulator pins. Accordingly, similarly to the case in which the regulator pins are abraded, isochronism of a balance with hairspring may be impaired, or the rate may be changed, and therefore the time measurement accuracy may be decreased.

SUMMARY OF THE INVENTION

It is an aspect of the present application to provide a regulator capable of further improving time measurement accuracy as compared with the related art, and a movement and timepiece including the regulator.

In order to solve the above problems, a regulator according to the application includes a regulator pin disposed so as to sandwich an outer end portion of a hairspring, in which at least a regulator pin main body that is to come into contact with the hairspring contains zirconia.

According to this configuration, by using the regulator pin made of a composite material containing zirconia, an abrasion amount of the regulator pin and the hairspring can be reduced as compared with the related art in which the regulator pin is formed of ruby or other metal materials. That is, as compared with the related art, abrasion of not only the regulator pin but also the hairspring can be prevented. Accordingly, a change in interval between the hairspring and the regulator pin due to the abrasion of the regulator pin or the hairspring can be further prevented, and a change in isochronism due to abrasion can be prevented. Further, abrasion powder generated when the hairspring is abraded can be prevented from adhering to the regulator pin. Therefore, it is possible to prevent a change in rate due to the generation of the abrasion powder and to stabilize the rate as compared with the related art.

Therefore, it is possible to provide the regulator capable of further improving time measurement accuracy as compared with the related art.

Regarding the regulator, at least the regulator pin main body contains 50% or more of zirconia.

According to this configuration, for example, a decrease in bending strength due to a decrease in toughness can be prevented as compared with a case in which a content of zirconia is less than 50%. Workability of the regulator pin main body can be improved as compared with the case of less than 50%. Therefore, it is possible to effectively prevent the abrasion of the regulator pin and the hairspring while maintaining the strength and the workability.

Regarding the regulator, the regulator pin includes a pair of the regulator pin main bodies, and a regulator pin base portion formed integrally with the pair of regulator pin main bodies and held by a regulator body.

According to this configuration, since the pair of regulator pin main bodies and the regulator pin base portion are formed integrally, the interval between the pair of regulator pin main bodies and a parallelism of the pair of regulator pin main bodies can be maintained with high accuracy.

Regarding the regulator, in the regulator pin, by extrusion molding, an outer peripheral surface and an inner peripheral surface of the regulator pin are formed, and the regulator pin main body and the regulator pin base portion are formed integrally.

According to this configuration, the regulator pin main body and the regulator pin base portion can be simultaneously and integrally formed by extrusion molding. Therefore, manufacturing workability can be improved. Since zirconia has a low hardness and is less likely to damage a mold as compared with a material such as ruby or spinel, processing can be easily performed by extrusion molding. Therefore, manufacturability can be improved while utilizing characteristics of the material.

Further, since the inner peripheral surface of the regulator pin, that is, a portion that is to come into contact with the hairspring is formed by extrusion molding, a curved surface can be easily formed on the inner peripheral surface as compared with a case in which the inner peripheral surface is formed by cutting or the like. A surface of the inner peripheral surface can be formed smoothly. Accordingly, the inner peripheral surface of the regulator pin that is to come into contact with the hairspring can be formed into an optimal shape without complicating a manufacturing process. Therefore, the abrasion of the hairspring can be further reduced. A tilt-adjustment can be performed with higher accuracy.

Regarding the regulator, the regulator pin includes a pair of the regulator pin main bodies, and a regulator pin base portion to which the pair of regulator pin main bodies are attached and which is held by a regulator body.

According to this configuration, since the pair of regulator pin main bodies and the regulator pin base portion are formed separately, for example, the regulator pin main bodies and the regulator pin base portion can be formed of different materials. Accordingly, versatility of the regulator pin can be improved while reducing the abrasion of the regulator pin and the hairspring.

A movement according to the application includes the regulator described above, and a balance with hairspring to which the hairspring is attached.

According to this configuration, since the movement includes the regulator described above, the abrasion of the regulator pin and the hairspring can be prevented. Accordingly, the change in isochronism and change in rate due to the abrasion can be prevented.

Therefore, it is possible to provide the high-performance movement including the regulator capable of further improving the time measurement accuracy as compared with the related art.

A timepiece according to the application includes the movement described above.

According to this configuration, the timepiece includes the movement including the regulator described above. Therefore, the abrasion of the regulator pin and the hairspring can be prevented, and the change in isochronism and change in rate due to the abrasion can be prevented.

Therefore, it is possible to provide the highly accurate timepiece including the regulator capable of further improving the time measurement accuracy as compared with the related art.

According to the application, it is possible to provide a regulator capable of further improving time measurement accuracy as compared with the related art, and a movement and timepiece including the regulator.

DETAILED DESCRIPTION OF THE PREFERRED EMBODIMENTS

Figure 1:
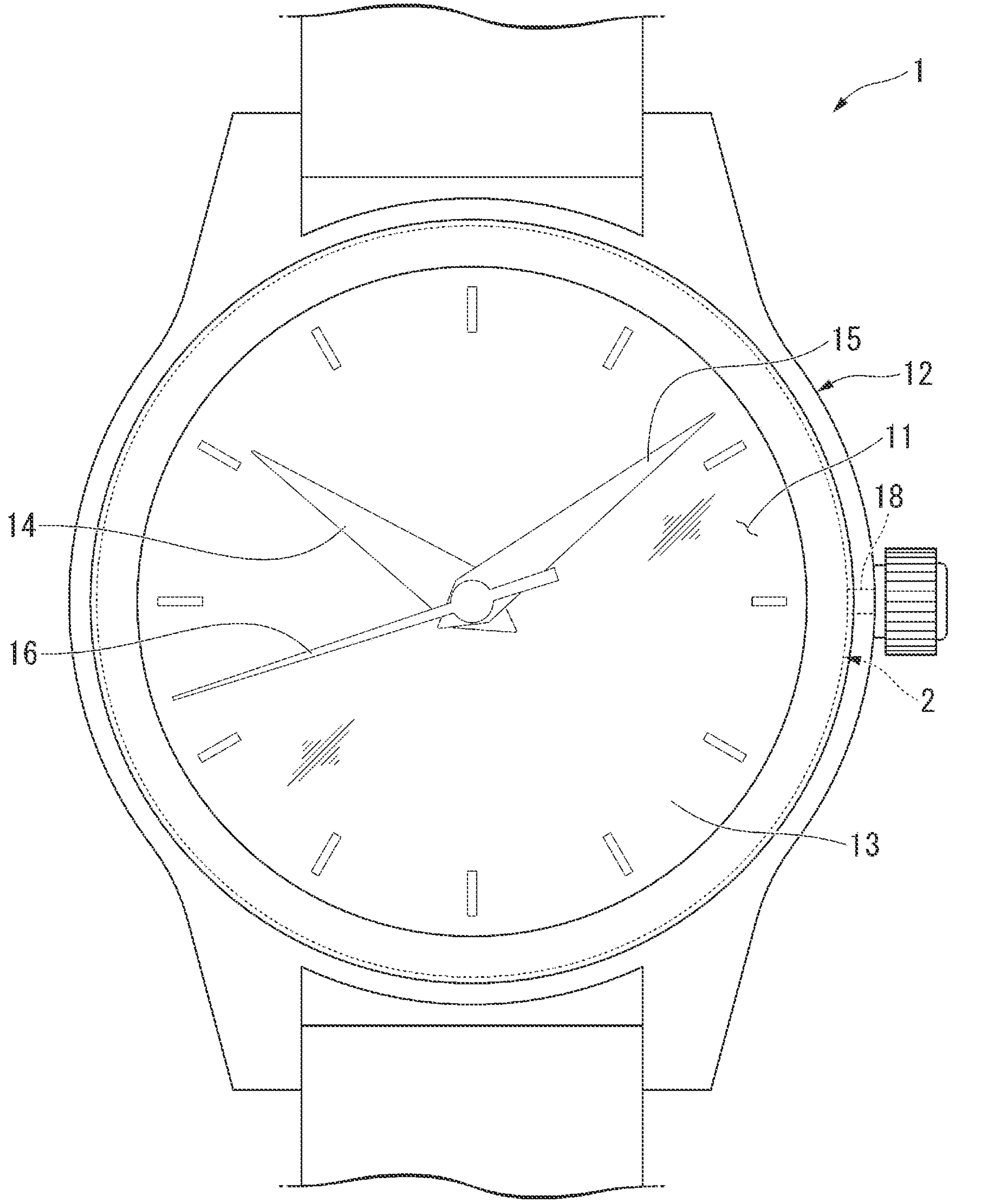
FIG. 1 is an external view of a timepiece according to a first embodiment.

Hereinafter, embodiments of the invention will be described with reference to the drawings. In the following description, configurations having the same or similar functions are denoted by the same reference numerals. Repeated descriptions of these configurations may be omitted.

First Embodiment (Timepiece)

FIG. 1 is an external view of a timepiece according to a first embodiment.

A timepiece 1 is implemented by incorporating a movement 2, a dial 13 having an indicator indicating information about a time point or the like, and various hands (an hour hand 14, a minute hand 15, and a seconds hand 16) in a timepiece case 12 including a case lid (not illustrated) and a glass 11.

(Movement)

Figure 2:
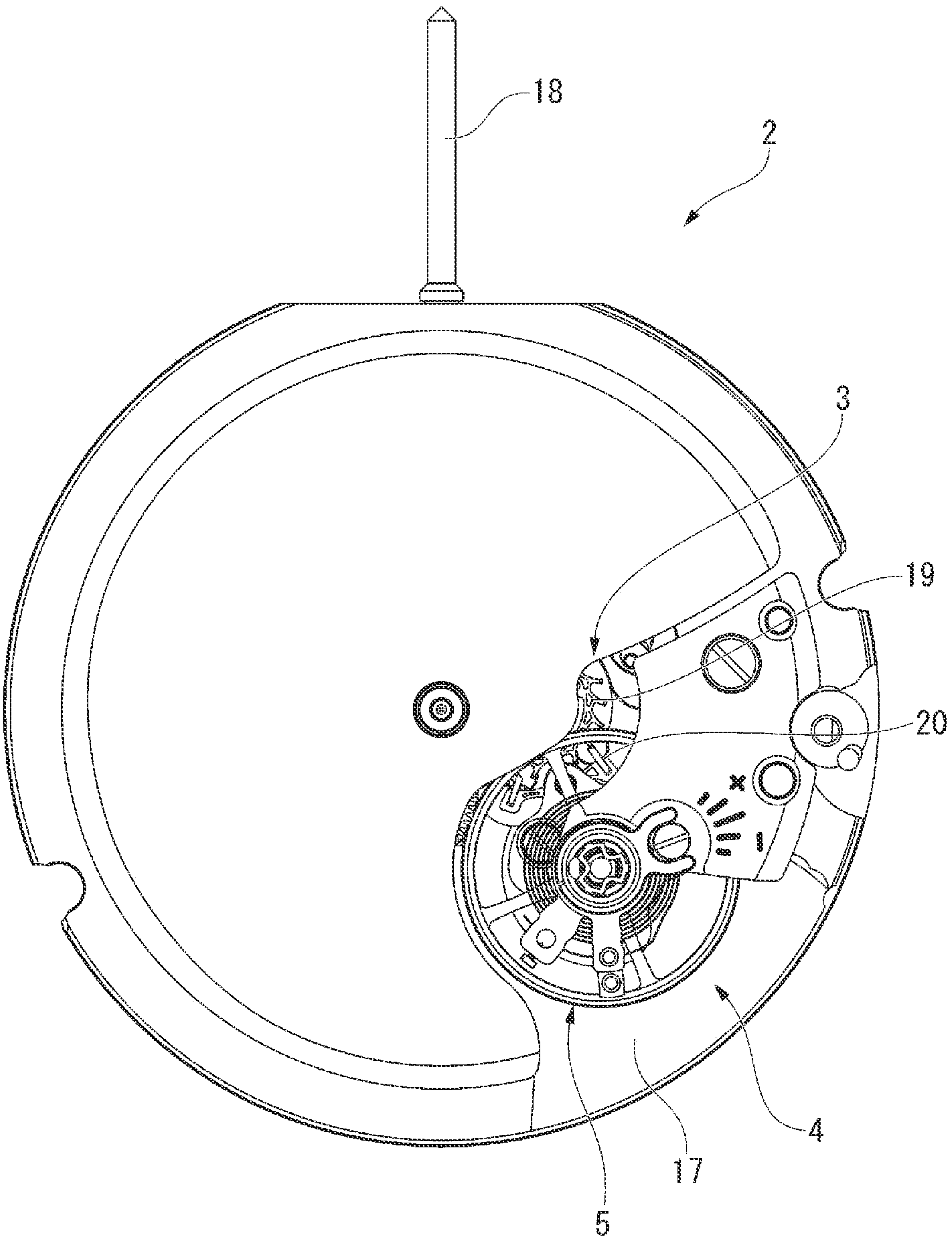
FIG. 2 is a plan view of a movement according to the first embodiment as viewed from a front side.

FIG. 2 is a plan view of the movement 2 according to the first embodiment as viewed from a front side. In FIG. 2, some components may be omitted in order to make the drawing easier to see. In the following description, a glass 11 side (a dial 13 side) of the timepiece case 12 (see FIG. 1) is referred to as a “back side” of the movement 2 with respect to a main plate 17 constituting a base plate of the movement 2, and a case lid side (a side opposite to the dial 13) is referred to as a “front side” of the movement 2.

The movement 2 includes the main plate 17, a front train wheel (not illustrated) including a movement barrel, a center wheel and pinion, a third wheel and pinion, and a seconds wheel and pinion, and an escapement governor 3 for controlling a rotation of the front train wheel. The movement 2 illustrated in the drawing is an example of a movement for an automatic winding timepiece provided with an oscillating weight (not illustrated). The invention is not limited to this case, and may be a movement for a manual winding timepiece adjusted by a setting stem 18.

The seconds hand 16 illustrated in FIG. 1 is rotated based on a rotation of the second wheel and pinion, and is also rotated at a rotation speed adjusted by the escapement governor 3, that is, one rotation per minute. The minute hand 15 is rotated based on a rotation of the center wheel and pinion or a rotation of a center wheel that is rotated with the rotation of the center wheel and pinion, and is also rotated at a rotation speed adjusted by the escapement governor 3, that is, one rotation per hour. The hour hand 14 is rotated based on a rotation of an hour wheel that is rotated with the rotation of the center wheel and pinion via a minute wheel, and is also rotated at a rotation speed adjusted by the escapement governor 3, that is, one rotation per 12 hours or 24 hours.

As illustrated in FIG. 2, the escapement governor 3 includes an escape wheel and pinion 19 and a pallet fork 20 that mesh with the second wheel and pinion, and a balance bridge unit 4. The pallet fork 20 causes escape of the escape wheel and pinion 19. The balance bridge unit 4 includes a balance with hairspring 5 that is operated regularly at a constant cycle.

(Balance Bridge Unit)

Figure 3:
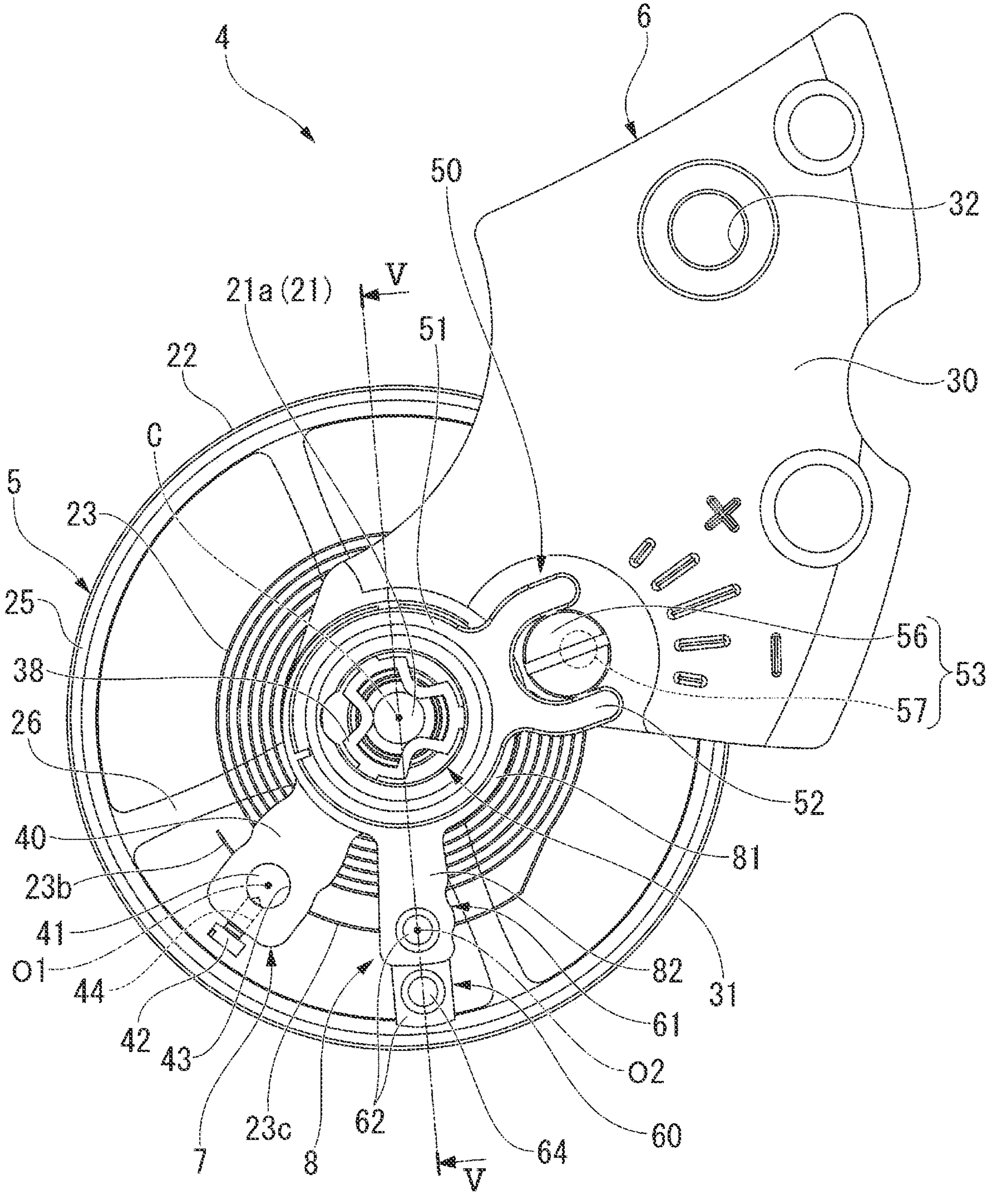
FIG. 3 is a plan view of a balance bridge unit according to the first embodiment as viewed from the front side.
Figure 4:
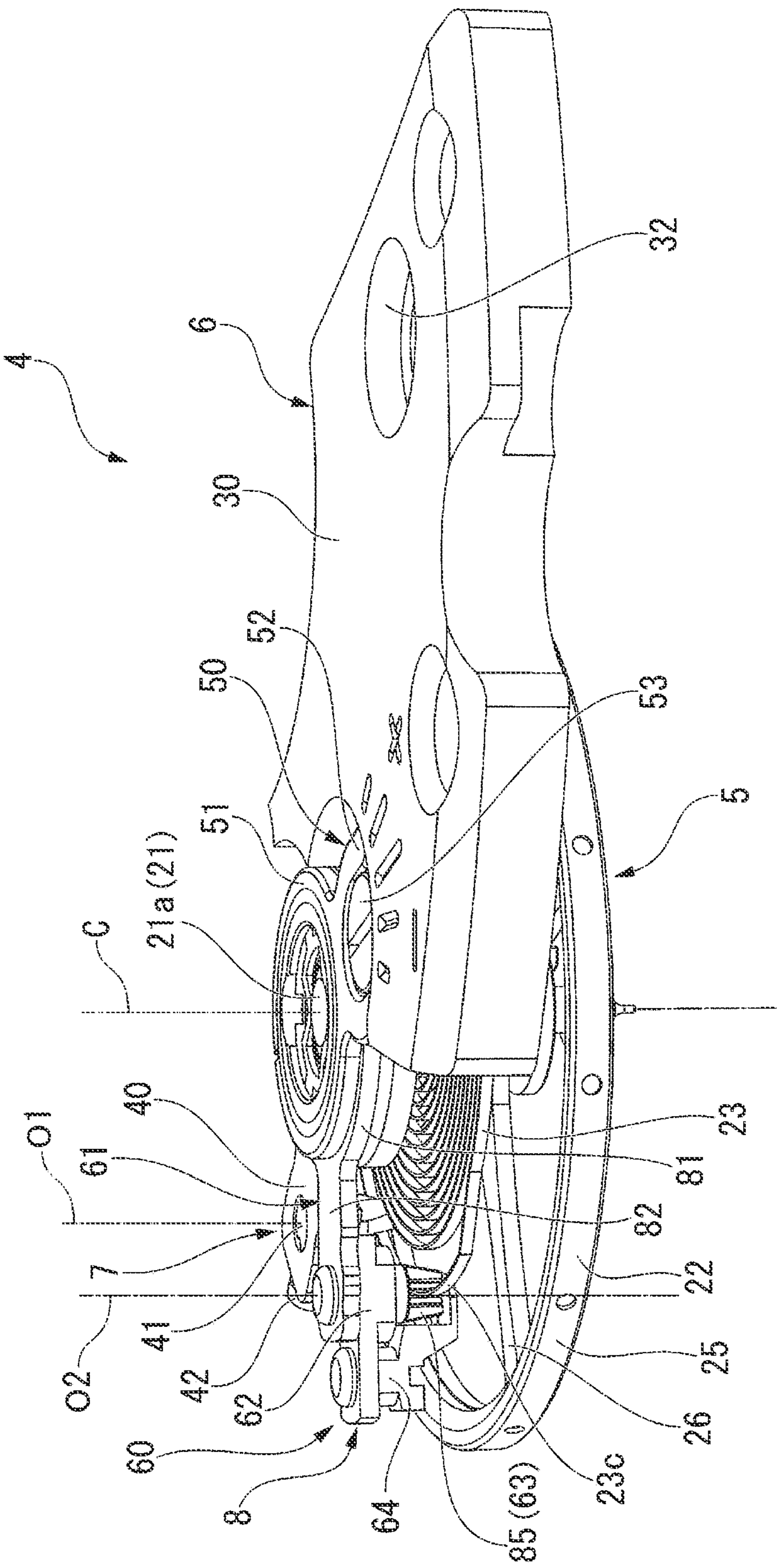
FIG. 4 is a perspective view of the balance bridge unit according to the first embodiment.
Figure 5:
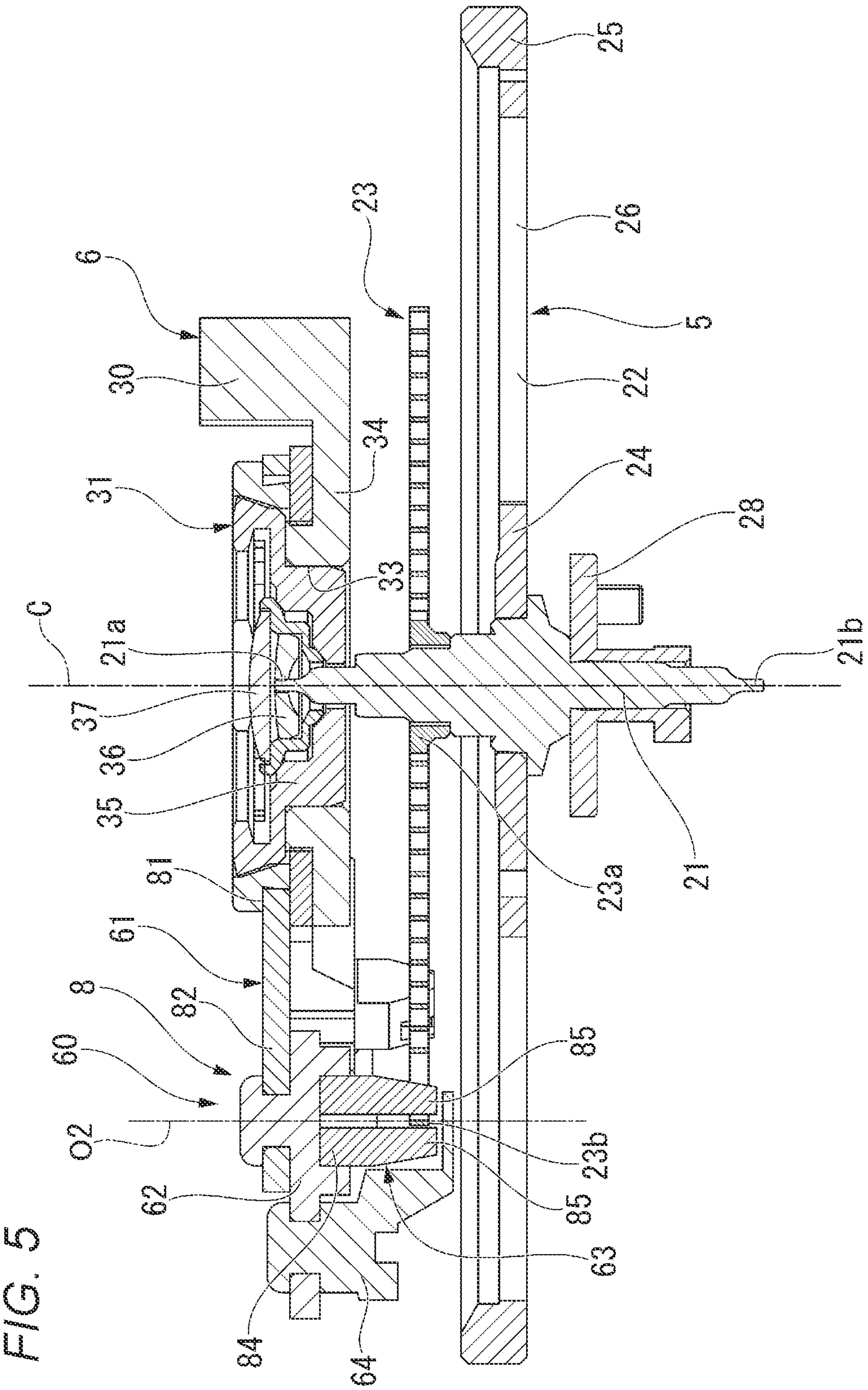
FIG. 5 is a cross-sectional view taken along a line V-V in FIG. 3.

FIG. 3 is a plan view of the balance bridge unit 4 according to the first embodiment as viewed from the front side. FIG. 4 is a perspective view of the balance bridge unit 4 according to the first embodiment. FIG. 5 is a cross-sectional view taken along a line V-V in FIG. 3.

As illustrated in FIGS. 3 to 5, the balance bridge unit 4 includes the balance with hairspring 5, a balance bridge 6, a hairspring adjusting mechanism 7, and a regulator mechanism 8.

(Balance with Hairspring)

The balance with hairspring 5 includes a balance staff 21, a balance wheel 22, and a hairspring 23. The balance staff 21 is rotatable around a central axis C. The balance staff 21 is rotatably supported by the balance bridge 6, which will be described later, via a bearing 31.

In the following description, a direction along the central axis C of the balance staff 21 is referred to as an axial direction, a direction orthogonal to the central axis C is referred to as a radial direction, and a direction orbiting around the central axis C is referred to as a peripheral direction.

As illustrated in FIG. 5, the balance wheel 22 includes a hub portion 24 fixed to the balance staff 21 by press-fitting or the like, an annular rim portion 25 surrounding the hub portion 24 from an outside in the radial direction, and a connection portion 26 connecting the hub portion 24 and the rim portion 25.

The hairspring 23 is disposed between the balance staff 21 and the balance wheel 22. The hairspring 23 is a spiral flat spring as viewed from the axial direction and is wound along an Archimedes curve. An inner end portion 23*a* of the hairspring 23 is connected to the balance staff 21. An outer end portion 23*b* of the hairspring 23 is connected to a stud 41 (see FIG. 3) of the hairspring adjusting mechanism 7, which will be described later in detail. A portion of the hairspring 23 that is positioned on an outermost diameter side and includes the outer end portion 23*b* is an arc-shaped portion 23*c* (see FIG. 3) that bulges outward in the radial direction.

The balance staff 21 is rotated forward and backward at a constant vibration cycle around the central axis C by power transmitted from the hairspring 23. One end portion 21*a* (a front side end portion) of the balance staff 21 in the axial direction is supported by the balance bridge 6 via the bearing 31, and the other end portion 21*b* (a back side end portion) is supported by a bearing (not illustrated) formed in the main plate 17 (see FIG. 2). A cylindrical swing seat 28 linked to the pallet fork 20 described above is externally attached to the other end portion 21*b* of the balance staff 21.

(Balance Bridge)

As illustrated in FIG. 5, the balance bridge 6 is disposed closer to the front side relative to the balance with hairspring 5 in the axial direction. The balance bridge 6 includes an attaching base portion 30 and the bearing 31.

As illustrated in FIGS. 3 and 4, the attaching base portion 30 extends from the central axis C toward one side in the radial direction as viewed from the axial direction. The attaching base portion 30 is formed in a flat plate shape with the axial direction as a thickness direction. An end portion of the attaching base portion 30 in an extending direction is formed in an arc shape that matches a shape of the timepiece case 12 (also see FIG. 2). A plurality of attaching holes 32 penetrating in the axial direction are formed in the attaching base portion 30. The balance bridge unit 4 is fixed to the main plate 17 (see FIG. 2) via a fixing screw (not illustrated) inserted into the attaching hole 32. As illustrated in FIG. 5, the attaching base portion 30 includes a central hole 33 formed coaxially with the central axis C. A portion of the attaching base portion 30 that forms an outer peripheral portion of the central hole 33 is defined as a bearing cylinder portion 34. The bearing cylinder portion 34 is formed to be lowered by one step on the back side with respect to the attaching base portion 30.

The bearing 31 is a so-called shock absorbing bearing, and includes a bearing frame 35, a hole jewel 36, and a cap jewel 37.

The bearing frame 35 is press-fitted into the bearing cylinder portion 34 from the front side in the axial direction. Accordingly, the bearing frame 35 is disposed coaxially with the central axis C and is fixed to the balance bridge 6.

The hole jewel 36 is attached to the bearing frame 35. The hole jewel 36 rotatably supports the one end portion 21*a* of the balance staff 21.

The cap jewel 37 is disposed so as to be overlapped with the hole jewel 36, and supports the one end portion 21*a* of the balance staff 21 from the front side. A cap jewel hold spring 38 (see FIG. 3) that biases the cap jewel 37 toward the balance staff 21 is disposed to be overlapped on the cap jewel 37.

A configuration of the bearing 31 is merely an example, and is not limited to the above configuration as long as the balance staff 21 can be rotatably supported.

(Hairspring Adjusting Mechanism)

As illustrated in FIGS. 3 and 4, the hairspring adjusting mechanism 7 includes the hairspring 23 described above, a stud support 40, the stud 41, and a screw member 42.

The stud support 40 is connected to the balance bridge 6. The stud support 40 is externally fitted to the bearing cylinder portion 34 of the balance bridge 6. An inner end portion of the stud support 40 in the radial direction is formed in a C-shape in a plan view as viewed from the axial direction. The inner end portion of the stud support 40 in the radial direction slides with respect to the bearing cylinder portion 34 when a predetermined rotational torque is applied. Accordingly, the stud support 40 is rotatable around the central axis C with respect to the bearing cylinder portion 34.

A stud insertion hole 43 and a fastening hole 44 are formed in an outer end portion of the stud support 40 in the radial direction. The stud insertion hole 43 penetrates the stud support 40 along a first axis O1 parallel to the central axis C. The fastening hole 44 is provided in a side surface of the outer end portion of the stud support 40 in the radial direction. The fastening hole 44 is a hole with a direction (the radial direction) intersecting with the first axis O1 as a depth direction, and communicates with the stud insertion hole 43. A female screw is formed in an inner peripheral portion of the fastening hole 44.

The stud 41 is inserted into the stud insertion hole 43 of the stud support 40. The stud 41 is provided coaxially with the first axis O1. The stud 41 is rotatably supported around the first axis O1. The outer end portion 23*b* of the hairspring 23 is fixed to an end portion of the stud 41 on the back side.

The screw member 42 is fitted to the fastening hole 44. The screw member 42 is, for example, a bolt including a male screw portion on an outer surface thereof. A recessed groove (not illustrated) into which a tool such as a driver can be inserted is formed in an outer end surface of the screw member 42 in the radial direction. By tightening the screw member 42 so that the screw member 42 moves inward in the radial direction, the stud 41 is fixed to the stud support 40 at a predetermined position. On the other hand, by loosening the screw member 42 so that the screw member 42 moves outward in the radial direction, the stud 41 becomes rotatable with respect to the stud support 40, and a rotation angle of the stud 41 can be adjusted.

(Regulator Mechanism)

The regulator mechanism 8 includes a fine movement regulator lever 50 and a regulator 60.

As illustrated in FIGS. 3 and 4, the fine movement regulator lever 50 is attached to the bearing frame 35 (see FIG. 5) so as to be rotatable around the central axis C. The fine movement regulator lever 50 includes a fitting portion 51 fitted to the bearing frame 35, and an engagement fork 52 that extends outward in the radial direction from the fitting portion 51 and is formed in a bifurcated shape branching in the peripheral direction. An adjusting pin 53 is disposed inside the engagement fork 52. The adjusting pin 53 is rotatably fitted to the balance bridge 6. The adjusting pin 53 includes a head portion 56 positioned on the front side and a shaft portion 57 extending from the head portion 56 to the back side. The shaft portion 57 is rotatably fitted to the balance bridge 6. The head portion 56 is provided eccentrically with respect to the shaft portion 57. The head portion 56 is slidably in contact with an inner surface of the engagement fork 52. Therefore, by rotating the adjusting pin 53 with respect to the balance bridge 6, the entire fine movement regulator lever 50 can be rotated around the central axis C of the balance with hairspring 5.

As illustrated in FIGS. 3 to 5, the regulator 60 includes a regulator body 61, a regulator pin support body 62, a regulator pin 63, and a regulator seat 64.

The regulator body 61 is rotatable around the central axis C. The regulator body 61 includes a base portion 81 that surrounds the fitting portion 51 of the fine movement regulator lever 50 from an outside in the radial direction, and a regulator arm 82 that extends outward from the base portion 81 in the radial direction.

The regulator pin support body 62 is attached to the regulator arm 82 in a state of being overlapped on a back side surface of the regulator arm 82 of the regulator body 61. The regulator pin support body 62 functions as a connection member for attaching the regulator pin 63 and the regulator seat 64, which will be described later, to the regulator body 61.

Figure 6:
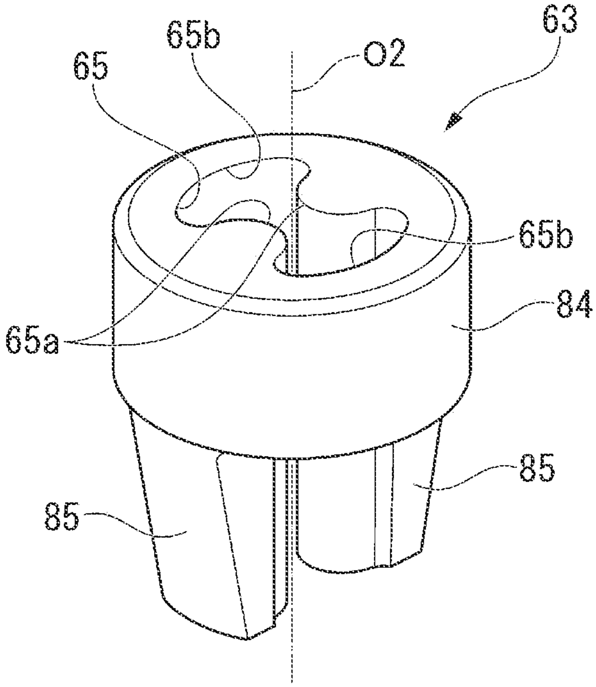
FIG. 6 is a perspective view of a regulator pin according to the first embodiment as viewed from the front side.
Figure 7:
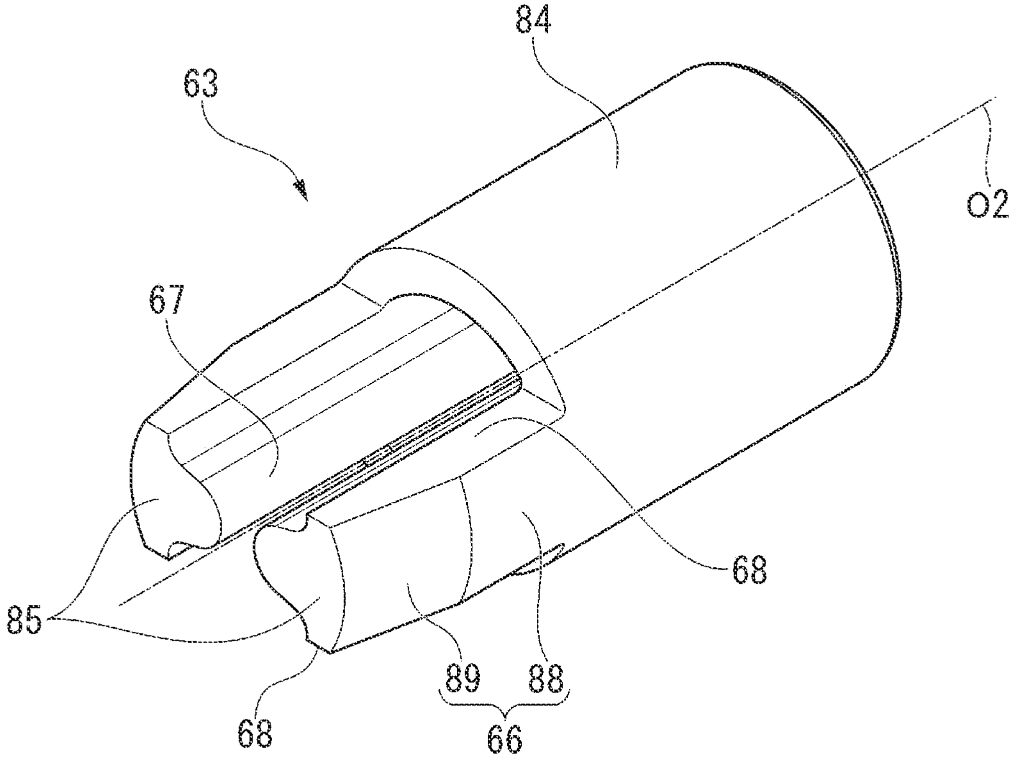
FIG. 7 is a perspective view of the regulator pin according to the first embodiment as viewed from a back side.
Figure 8:
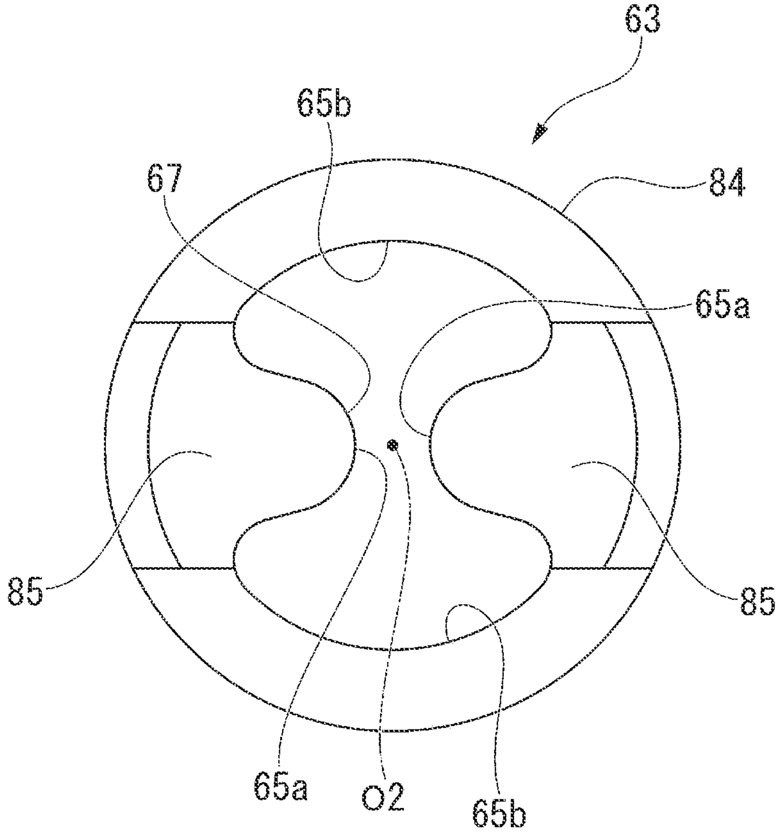
FIG. 8 is a plan view of the regulator pin according to the first embodiment.

FIG. 6 is a perspective view of the regulator pin 63 according to the first embodiment as viewed from the front side. FIG. 7 is a perspective view of the regulator pin 63 according to the first embodiment as viewed from the back side. FIG. 8 is a plan view of the regulator pin 63 according to the first embodiment as viewed from the back side.

As illustrated in FIG. 5, the regulator pin 63 is attached to an end portion of the regulator pin support body 62 on the back side. As illustrated in FIGS. 6 to 8, the regulator pin 63 includes a regulator pin base portion 84 and a pair of regulator pin main bodies 85. The regulator pin base portion 84 is a portion held by the regulator pin support body 62 (see FIG. 5). The regulator pin base portion 84 is formed in a cylindrical shape centered on a second axis O2 parallel to the central axis C. A hole 65 having an irregular shape penetrating in a direction of the second axis O2 is formed in the regulator pin base portion 84. Specifically, in the plan view, the hole 65 is formed in a gourd shape including a pair of convex portions 65*a* protruding in a direction approaching each other from both ends of a diameter of a virtual circle centered on the second axis O2 and a pair of arc-shaped portions 65*b* connecting the pair of convex portions 65*a* and extending along the virtual circle.

The regulator pin main body 85 is formed integrally with the regulator pin base portion 84. The regulator pin main body 85 extends from the regulator pin base portion 84 toward the back side in the axial direction. The pair of regulator pin main bodies 85 are provided corresponding to positions overlapping with the pair of convex portions 65*a* in the plan view. A gap is provided between the pair of regulator pin main bodies 85. As illustrated in FIGS. 4 and 5, the hairspring 23 is disposed in a state of being sandwiched in the gap between the pair of regulator pin main bodies 85. Since the pair of regulator pin main bodies 85 have a symmetrical shape, one of the regulator pin main bodies 85 will be described in the following description, and a description of the other regulator pin main body 85 will be omitted.

As illustrated in FIGS. 7 and 8, the regulator pin main body 85 is formed in a columnar shape including an outer peripheral surface 66 facing outward in the radial direction, an inner peripheral surface 67 facing inward in the radial direction, and a pair of side surfaces 68 connecting the outer peripheral surface 66 and the inner peripheral surface 67. The outer peripheral surface 66 includes a first outer peripheral surface 88 continuous with an outer peripheral surface of the regulator pin base portion 84, and a second outer peripheral surface 89 inclined with respect to the first outer peripheral surface 88. The second outer peripheral surface 89 is inclined such that an outer diameter thereof decreases toward a distal end direction (a direction away from the regulator pin base portion 84). The inner peripheral surface 67 of the regulator pin main body 85 is continuous with the convex portion 65*a* of the regulator pin base portion 84. The inner peripheral surface 67 is formed to have the same shape as the convex portion 65*a* in the plan view. The inner peripheral surface 67 is a curved surface protruding inward in the radial direction. The pair of side surfaces 68 connect ends of the outer peripheral surface 66 in the peripheral direction and ends of the inner peripheral surface 67 in the peripheral direction, respectively.

In the regulator pin 63 described above, by extrusion molding, an outer peripheral surface and an inner peripheral surface of the regulator pin 63 are formed, and the regulator pin main body 85 and the regulator pin base portion 84 are integrally formed. In particular, since the convex portion 65*a* of the regulator pin base portion 84 and the inner peripheral surface 67 of the regulator pin main body 85 are formed to be continuous in the axial direction and have the same shape in the plan view, processing can be performed by extrusion molding. Specifically, first, the outer peripheral surface and the inner peripheral surface of the regulator pin 63 are formed in long rod shapes by extrusion molding. Further, the regulator pin 63 is cut to a required length, and the inclined second outer peripheral surface 89 is processed. Finally, the pair of side surfaces 68 is formed by removal processing. In this way, the regulator pin 63 described above is formed. By performing processing by extrusion molding, the inner peripheral surfaces 67, which are surfaces of the pair of regulator pin main bodies 85 that face each other, can be formed as smooth curved surfaces.

The regulator pin 63 is formed such that at least the regulator pin main body 85 that is to come into contact with the hairspring contains zirconia. In the present embodiment, since the regulator pin base portion 84 and the regulator pin main body 85 are integrally formed, the entire regulator pin 63 contains zirconia. The regulator pin 63 is formed of, for example, a ceramic material. The regulator pin 63 contains, for example, 50% or more of zirconia.

As illustrated in FIG. 5, the regulator seat 64 is attached to the regulator pin support body 62. A part of the regulator seat 64 is disposed below the arc-shaped portion 23*c* of the hairspring 23. Accordingly, the regulator seat 64 is disposed to face the regulator pin 63 in the axial direction with the hairspring 23 sandwich therebetween.

(Function and Effect)

Next, functions and effects of the regulator 60, the movement 2, and the timepiece 1 described above will be described.

According to the regulator 60 of the present embodiment, the regulator 60 includes the regulator pin 63 formed such that at least the regulator pin main body 85 that is to come into contact with the hairspring 23 contains zirconia. By using the regulator pin 63 made of a composite material containing zirconia, an abrasion amount of the regulator pin 63 and the hairspring 23 can be reduced as compared with the related art in which the regulator pin is formed of ruby or other metal materials. That is, as compared with the related art, abrasion of not only the regulator pin 63 but also the hairspring 23 can be prevented. Accordingly, a change in interval between the hairspring 23 and the regulator pin 63 due to the abrasion of the regulator pin 63 or the hairspring 23 can be further prevented, and a change in isochronism due to abrasion can be prevented. Further, abrasion powder generated when the hairspring 23 is abraded can be prevented from adhering to the regulator pin 63. Therefore, it is possible to prevent a change in rate due to the generation of the abrasion powder and to stabilize the rate as compared with the related art.

Therefore, it is possible to provide the regulator 60 capable of further improving time measurement accuracy as compared with the related art.

The regulator pin main body 85 contains 50% or more of zirconia. Accordingly, for example, a decrease in bending strength due to a decrease in toughness can be prevented as compared with a case in which a content of zirconia is less than 50%. Workability of the regulator pin main body can be improved as compared with the case of less than 50%. Therefore, it is possible to effectively prevent the abrasion of the regulator pin and the hairspring while maintaining the strength and the workability.

The regulator pin 63 includes the pair of regulator pin main bodies 85, and the regulator pin base portion 84 formed integrally with the pair of regulator pin main bodies 85 and held by the regulator body 61. Since the pair of regulator pin main bodies 85 and the regulator pin base portion 84 are formed integrally, the interval between the pair of regulator pin main bodies 85 and a parallelism between the pair of regulator pin main bodies 85 can be maintained with high accuracy.

The regulator pin 63 is formed by extrusion molding. Accordingly, the regulator pin main body 85 and the regulator pin base portion 84 can be simultaneously and integrally formed by extrusion molding. Therefore, manufacturing workability can be improved. Since zirconia has a low hardness and is less likely to damage a mold as compared with a material such as ruby or spinel, processing can be easily performed by extrusion molding. Therefore, manufacturability can be improved while utilizing characteristics of the material.

Further, since the inner peripheral surface of the regulator pin 63 (the inner peripheral surface 67 of the regulator pin main body 85), that is, a portion that is to come into contact with the hairspring 23 is formed by extrusion molding, a curved surface can be easily formed on the inner peripheral surface 67 as compared with a case in which the inner peripheral surface 67 is formed by cutting or the like. A surface of the inner peripheral surface 67 can be formed smoothly. Accordingly, the inner peripheral surface 67 of the regulator pin 63 that is to come into contact with the hairspring 23 can be formed into an optimal shape without complicating a manufacturing process. Therefore, the abrasion of the hairspring 23 can be further reduced. A tilt-adjustment can be performed with higher accuracy.

The movement 2 includes the regulator 60 described above, and the balance with hairspring 5 to which the hairspring 23 is attached. Since the movement 2 includes the regulator 60 described above, the abrasion of the regulator pin 63 and the hairspring 23 can be prevented. Accordingly, the change in isochronism and change in rate due to the abrasion can be prevented.

Therefore, it is possible to provide the high-performance movement 2 including the regulator 60 capable of further improving the time measurement accuracy as compared with the related art.

The timepiece 1 includes the movement 2 including the regulator 60 described above. Therefore, the abrasion of the regulator pin 63 and the hairspring 23 can be prevented, and the change in isochronism and change in rate due to the abrasion can be prevented.

Therefore, it is possible to provide the highly accurate timepiece 1 including the regulator 60 capable of further improving the time measurement accuracy as compared with the related art.

Second Embodiment

Figure 9:
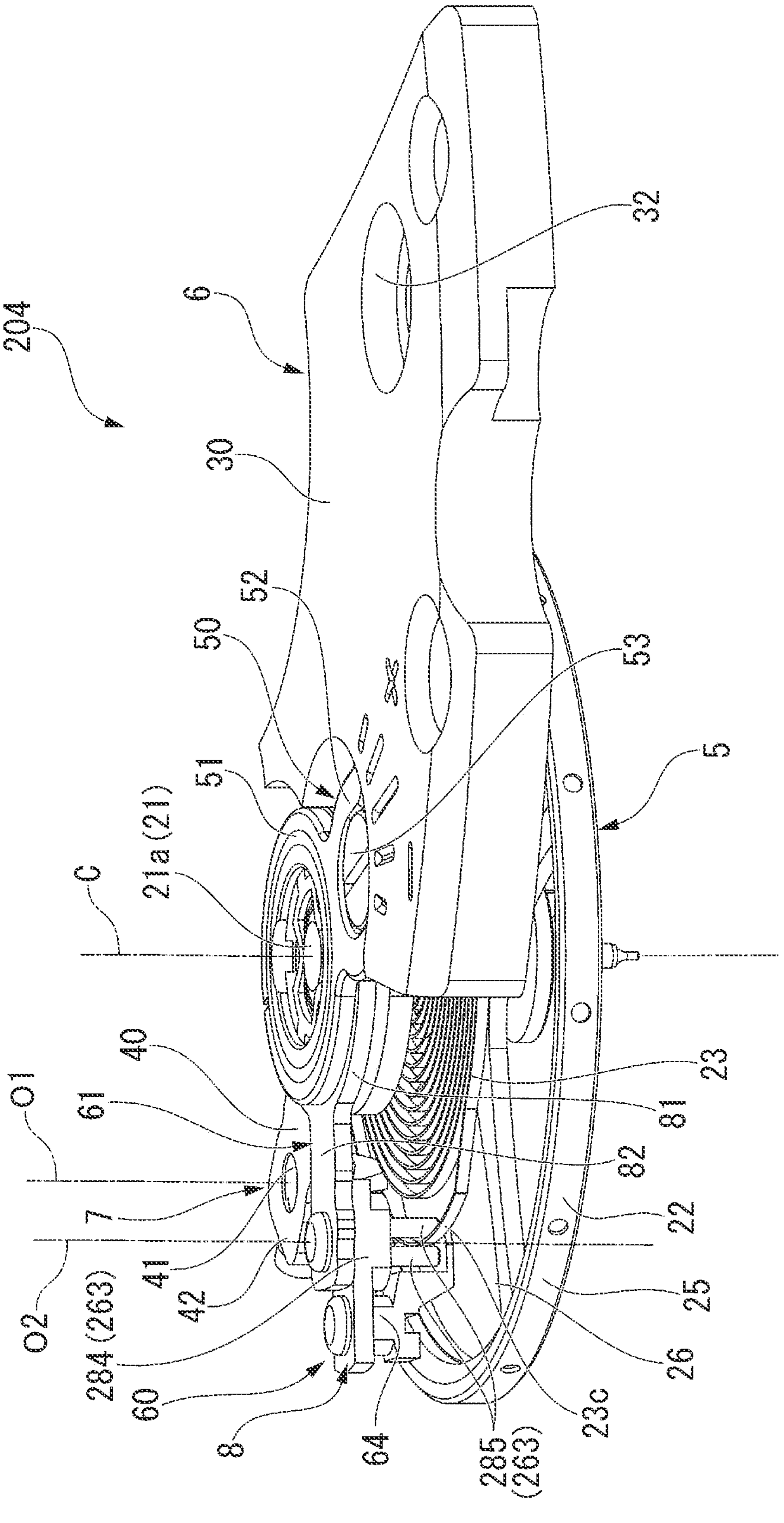
FIG. 9 is a perspective view of a balance bridge unit according to a second embodiment.
Figure 10:
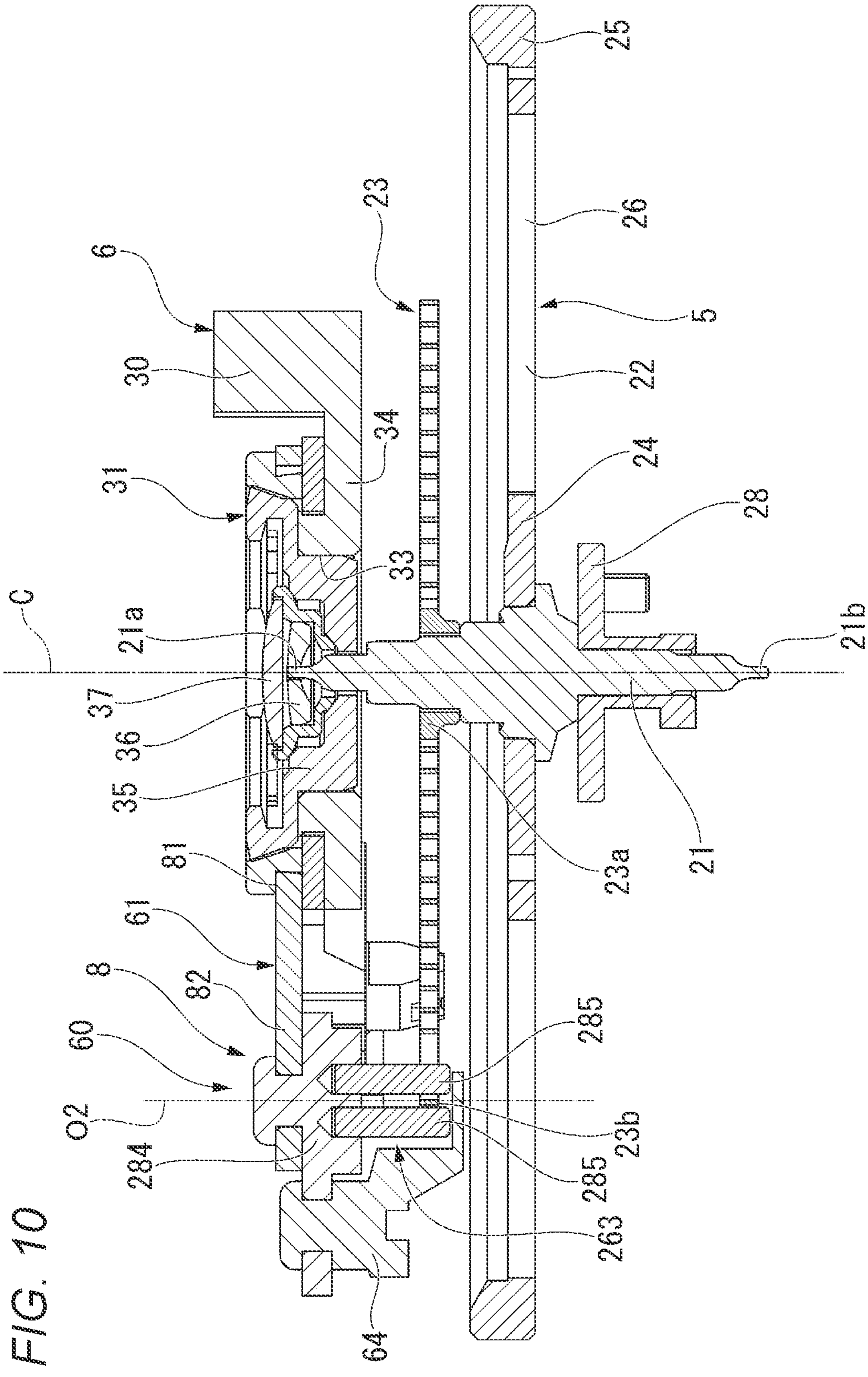
FIG. 10 is a cross-sectional view of the balance bridge unit according to the second embodiment.

Next, a second embodiment of the invention will be described. FIG. 9 is a perspective view of a balance bridge unit 204 according to a second embodiment. FIG. 10 is a cross-sectional view of the balance bridge unit 204 according to the second embodiment. FIG. 10 corresponds to, for example, the cross-sectional view taken along the line V-V in FIG. 3. The second embodiment is different from the first embodiment in that a regulator pin base portion 284 and a regulator pin main body 285 are provided separately.

As illustrated in FIGS. 9 and 10, in the second embodiment, a regulator pin 263 includes the regulator pin base portion 284 and a pair of the regulator pin main bodies 285. The regulator pin base portion 284 is attached to the regulator arm 82 of the regulator body 61. That is, the regulator pin base portion 284 according to the second embodiment also functions as the regulator pin support body 62 (see FIG. 5) according to the first embodiment.

The pair of regulator pin main bodies 285 are attached to the regulator pin base portion 284. Each of the regulator pin main bodies 285 is formed in a columnar shape. The regulator pin main body 285 contains zirconia. The pair of regulator pin main bodies 285 are attached to the regulator pin base portion 284 with a gap therebetween.

According to the second embodiment, since the pair of regulator pin main bodies 285 and the regulator pin base portion 284 are formed separately, for example, the regulator pin main bodies 285 and the regulator pin base portion 284 can be formed of different materials. Accordingly, versatility of the regulator pin 263 can be improved while reducing abrasion of the regulator pin 263 and the hairspring 23.

The technical scope of the invention is not limited to the above embodiments, and various modifications can be added without departing from the spirit of the invention.

For example, in the embodiments described above, an example has been described in which the hole 65 of the regulator pin base portion 84 is formed in a gourd shape, but the invention is not limited thereto. The shape of the hole of the regulator pin base portion 84 and the shape of the regulator pin main body 85 may be any shape as long as the regulator pin base portion 84 and the regulator pin main body 85 can be integrally formed by extrusion molding, and the portion (the inner peripheral surface 67) that is to come into contact with the hairspring 23 has at least a curved surface. The shape of the regulator pin 63 is not limited to the shape illustrated in the drawings.

A material for the regulator pin main bodies 85 and 285 may be a ceramic material containing zirconia, or may be a metal material containing zirconia.

In addition, it is possible to appropriately replace components in the above embodiments with known components without departing from the spirit of the invention, and the embodiments described above may be suitably combined.

What is claimed is:

1. A regulator, comprising:

a regulator pin formed to extend along an axis and terminate at a distal end that is formed with a pair of main bodies configured to sandwich an outer end portion of a hairspring between them, wherein the regulator pin is formed to have a first outer circumferential surface that has a radial distance from the axis longer than a radial distance of a second circumferential surface of the regulator pin located toward the distal end from the first outer circumferential surface, and wherein the pair of main bodies are made of a composite material containing zirconia, and wherein the regulator pin includes a base portion formed integrally with the pair of main bodies along the axis, and the base portion is formed with a through hole extending along the axis and has an inner peripheral surface formed with a pair of opposing convex ridges extending along the axis, wherein the pair of convex ridges formed in the inner peripheral surface of the base portion extend continuously along the axis without changing their shapes to form opposing convex surfaces of the pair of main bodies.

2. The regulator according to claim 1, wherein the pair of main bodies contains 50% or more of zirconia.

3. The regulator according to claim 1, wherein the regulator pin is formed only with the pair of main bodies.

4. A movement, comprising:

the regulator according to claim 1; and a balance to which a hairspring is attached.

5. A timepiece, comprising the movement according to claim 4.

* * * * *